United States Patent
Polling et al.

[11] Patent Number: 5,285,884
[45] Date of Patent: Feb. 15, 1994

[54] TIPPING CONVEYOR ELEMENT

[75] Inventors: Ludger Polling, Wadersloh; Gerhard Pelkmann, Beckum; Hans Jäger, Wadersloh, all of Fed. Rep. of Germany

[73] Assignee: Bernhard Beumer Maschinenfabrik KG, Fed. Rep. of Germany

[21] Appl. No.: 24,107

[22] Filed: Feb. 23, 1993

Related U.S. Application Data

[63] Continuation of Ser. No. 809,917, Dec. 20, 1991, abandoned.

[30] Foreign Application Priority Data

Dec. 14, 1991 [DE] Fed. Rep. of Germany ............ 91156645[U]
Dec. 20, 1991 [DE] Fed. Rep. of Germany ............ 90175131[U]

[51] Int. Cl.$^5$ .............................. B65G 47/38
[52] U.S. Cl. .................. 198/365; 198/803.14
[58] Field of Search .............. 198/365, 372, 699.1, 198/706, 803.2, 803.14; 209/517, 698

[56] References Cited

U.S. PATENT DOCUMENTS

| | | | |
|---|---|---|---|
| 3,119,488 | 1/1964 | Rabinow et al. | 198/706 |
| 3,269,520 | 8/1966 | Bishop et al. | 198/706 X |
| 3,578,144 | 5/1971 | Punzak | 198/803.14 X |
| 3,895,982 | 7/1975 | Persson | 198/699.1 X |
| 3,913,726 | 10/1975 | Gray | 198/803.14 X |
| 4,102,448 | 7/1978 | Wolbrink et al. | 198/365 |
| 4,227,609 | 10/1980 | Gunther et al. | 198/711 |
| 4,586,613 | 5/1986 | Horii | 198/365 X |
| 4,722,430 | 2/1988 | Canziani | 198/365 |
| 4,726,464 | 2/1988 | Canziani | 198/365 |
| 4,744,454 | 5/1988 | Polling | 198/365 |
| 4,787,505 | 11/1988 | Tweedy | 198/803.14 X |
| 4,829,751 | 5/1989 | Tisma | 198/803.2 X |
| 4,961,489 | 10/1990 | Warkentin | 198/706 X |

FOREIGN PATENT DOCUMENTS

| | | | |
|---|---|---|---|
| 2905313 | 8/1979 | Fed. Rep. of Germany | 198/365 |
| 0035069 | 3/1977 | Japan | 198/365 |
| 0019221 | 2/1982 | Japan | 198/706 |
| 0369072 | 8/1973 | U.S.S.R. | 198/803.14 |
| 1191378 | 11/1985 | U.S.S.R. | 198/803.14 |
| 2040875 | 9/1980 | United Kingdom | 198/803.14 |

Primary Examiner—James R. Bidwell
Attorney, Agent, or Firm—Wegner, Cantor, Mueller & Player

[57] ABSTRACT

The invention refers to a tipping conveyor element for a continuous piece goods conveyor the driven barrow tram of which included many flexibly linked conveyor elements that each have a tray-shaped supporting plate in their upper end section. The first supporting plate sections of this supporting plate running in conveyor direction are preferably bent or curved upward in relation to the next adjacent section inward, i.e., the second supporting plate sections. A third supporting plate section is connected to a second supporting plate section inward. This third section is inclined or curved downward in relation to the adjacent second supporting plate section.

6 Claims, 3 Drawing Sheets

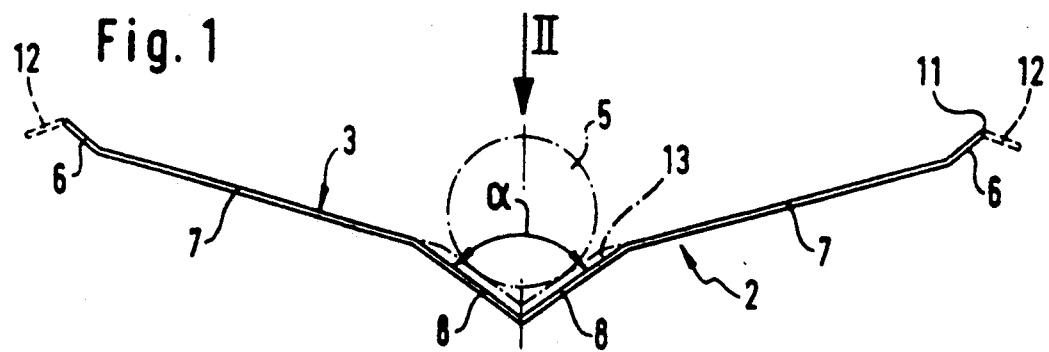
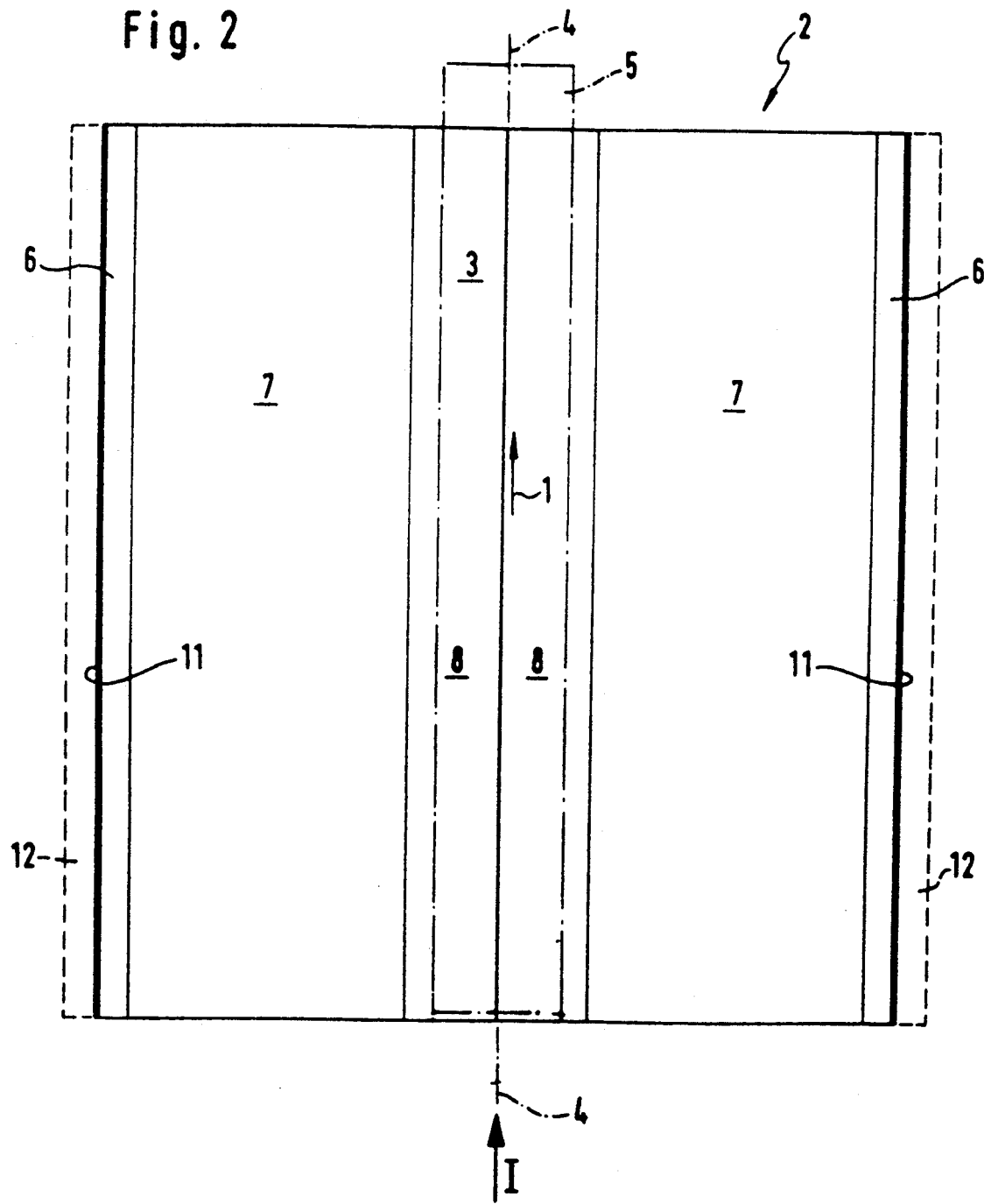

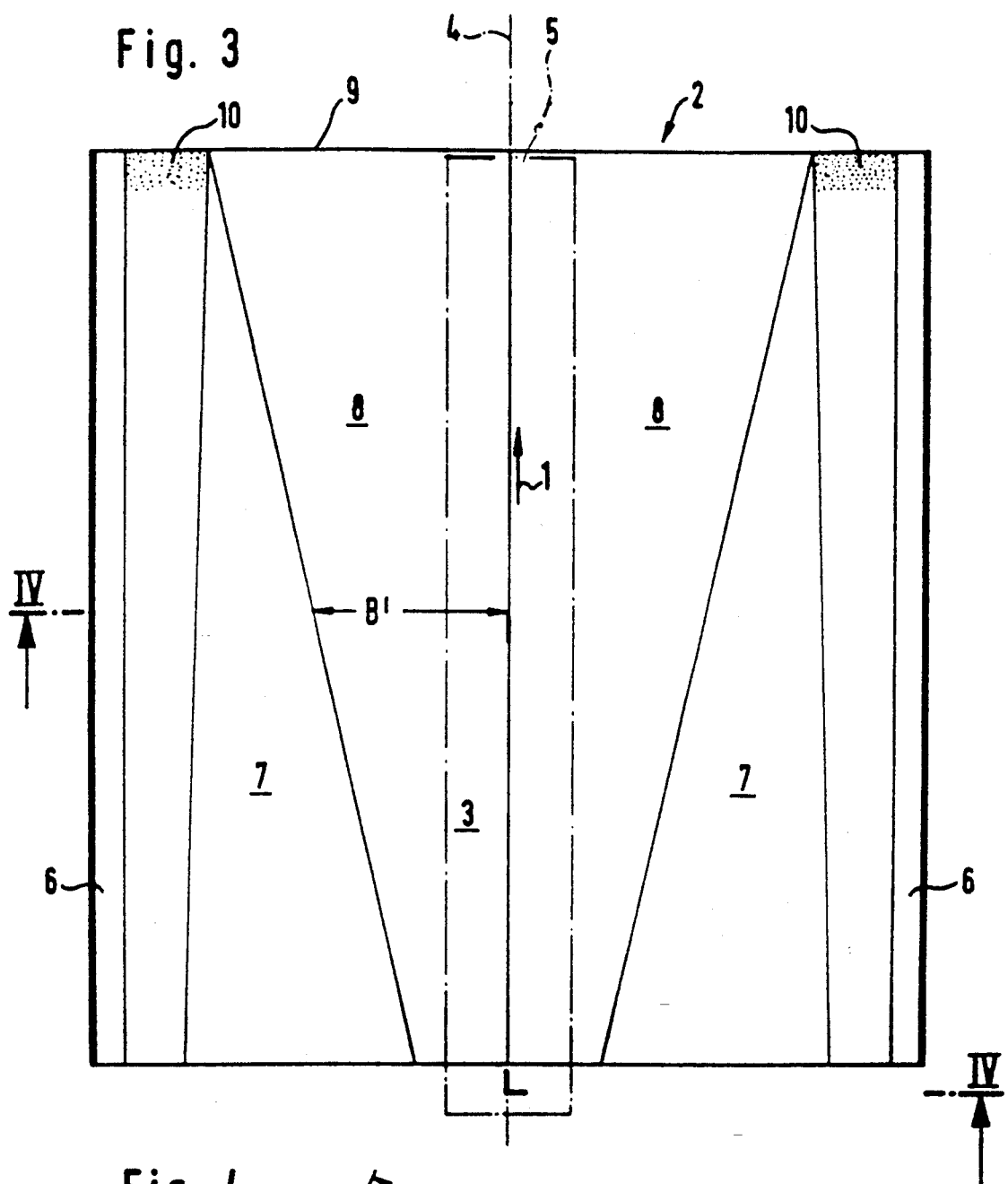
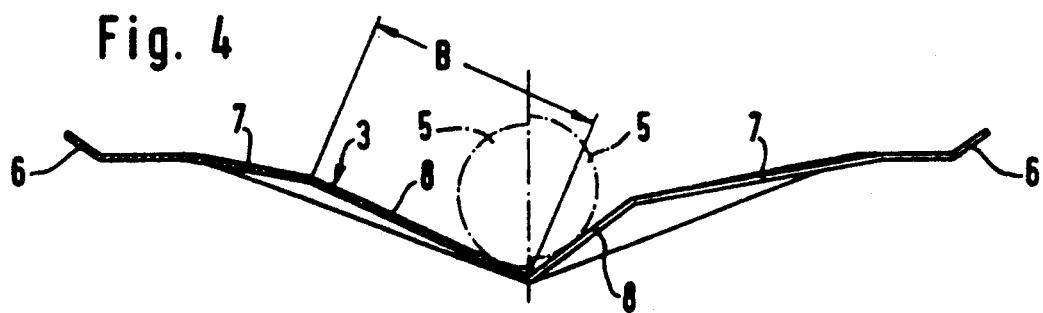

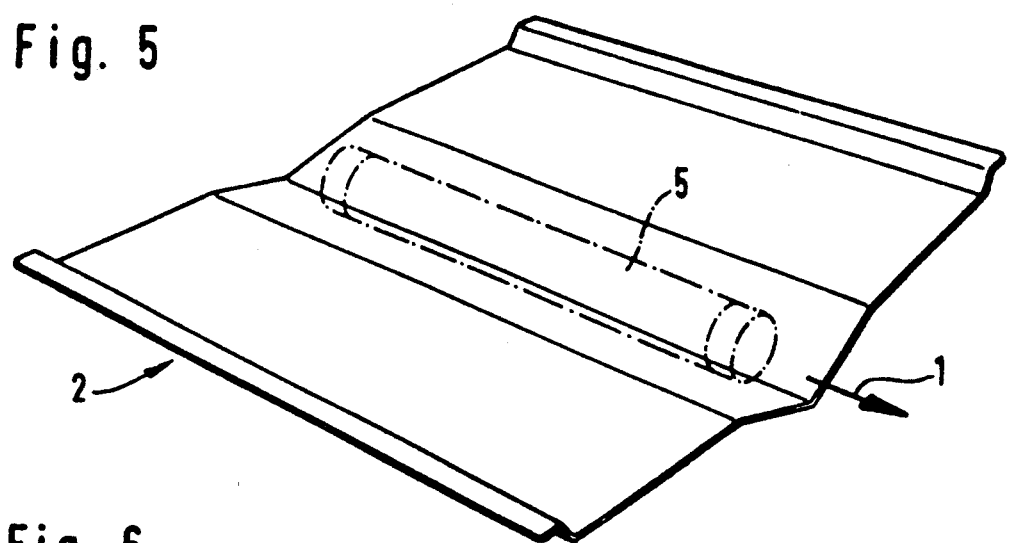
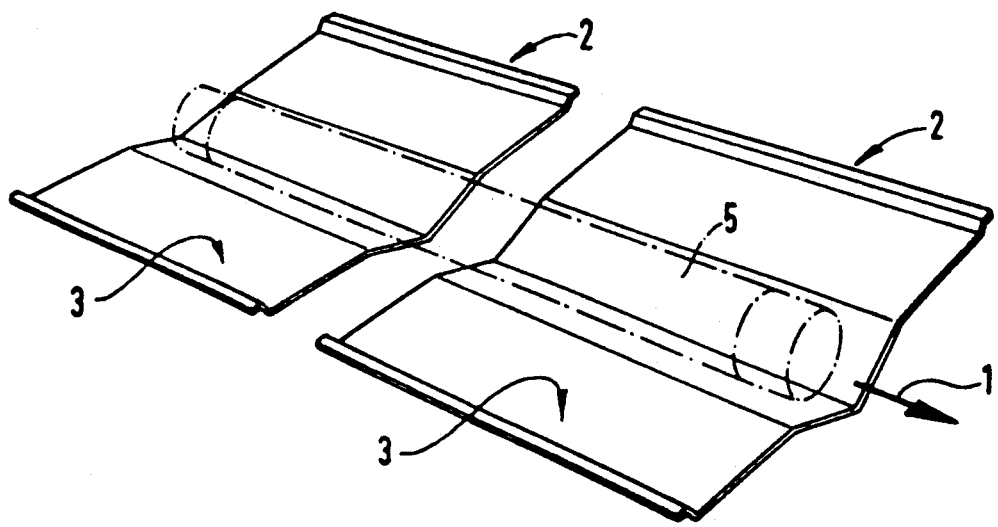
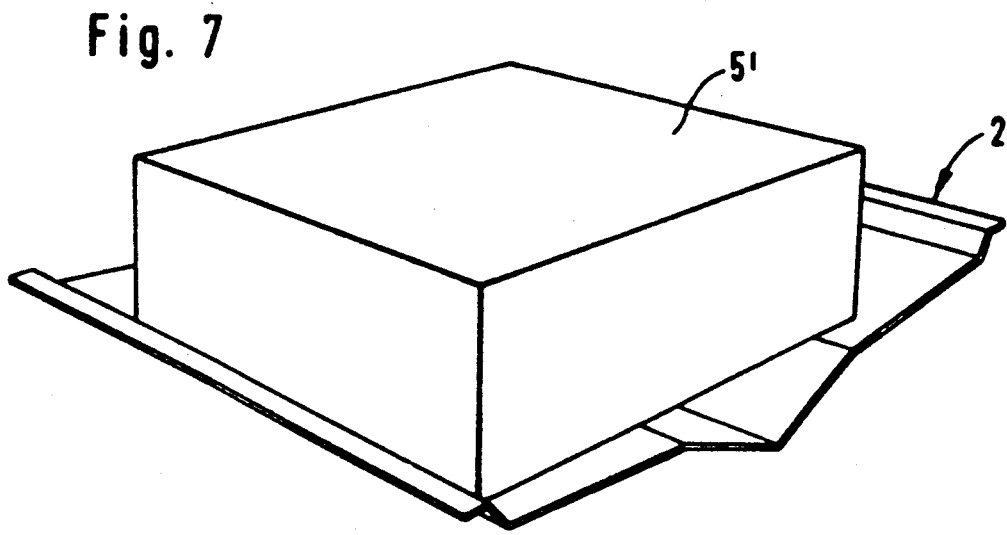

TIPPING CONVEYOR ELEMENT

This application is a continuation of U.S. application Ser. No. 07/809,917 filed Dec. 20, 1991, now abandoned.

BACKGROUND OF THE INVENTION

The present invention refers to a tipping conveyor element for a continuous piece goods conveyor generally referred to as a tipping bucket conveyor for short. Its driven barrow tram consists mainly of a number of conveying elements connected flexibly with each other. At their upper end-section these elements each have a dish-shaped supporting plate, whose edge sections (=first supporting plate sections) running in the conveying direction are each (i.e. on both sides of the symmetric line) bent or curved upwards in relation to the section (=second supporting plate sections) adjacent to this section toward the inside (=i.e. toward the middle).

Such tipping bucket conveyors are used today particularly as sorters for packet or luggage distributing facilities, for example.

The piece goods are fed to the sorter at at least one feed point (but often at several feed points) manually or preferably with appropriate feeding devices in such a way that they are each placed on the supporting surface of a conveying element. In the process, the barrow tram generally circulates on a horizontal plane, but it can also run at an incline or vertically, in which case precautions are taken that the piece goods do not unintentionally slide down from the supporting surfaces.

The essential task of a sorter consists of calculatedly feeding each of the piece goods to one of several feed stations arranged laterally to the conveyor belt in order to sort them according to determined criteria. For postal packages, for example, this can be sorting by zip code or, in the case of a sorter deployed at an airport, sorting of pieces of checked luggage according to flight destination, a certain flight number or the like.

We are familiar with a tipping conveyor system from DE-OS 14 31 736 the conveyor elements of which have a level, horizontal supporting plate with an accordingly designed supporting surface. Such conveyor elements are completely inappropriate for many types of piece goods, particularly (but not exclusively) when considering piece goods such as cylindrical rolls of drawings or the like which, after being fed onto a tipping conveyor element with level, horizontal supporting plate or surface, would roll off of the conveyor element.

Thus, we are already familiar with dish-shaped tipping conveyor elements (see DE-AS 2 037 380, for example) whose bottom forming the actual supporting surface is level only in the middle area (and in the normal conveyor position—i.e. not in the tipping position—horizontal), while the adjacent edge sections on both sides are curved upward at an angle of just a few degrees.

These previously known conveyor elements are also inappropriate for sure handling of piece goods such as cylindrical rolls of drawings, for example, because they have high, flange-like ridges at both of their edges running crosswise to the conveyor direction in such a way that there is the same problem if the rolls of drawings or the like are longer than the measured length of a conveyor element in conveyor direction.

There are therefore dish-shaped tipping conveyor elements of a similar type (see DE-OS 1 431 845, for example) that have no such edge ridge running crosswise to the conveyor direction. But with these known conveyor elements as well, sure handling of rolls of drawings or the like is still not possible because the incline of the two supporting plate sections designed symmetrically to the longitudinal center line is only a few degrees, as is the case for the conveyor elements according to DE 30 50 102 Al.

A (tipping) conveyor element of the type described at the beginning is known from DE-PS 36 02 861 in which the edge sections running in conveyor direction (first supporting plate sections) are each curved upward in relation to the adjacent second supporting plate section connected inward or toward the middle. In this arrangement, in a manner similar to that of the conveyor element according to the already mentioned DE-AS 2 037 380, the level second supporting plate section runs horizontally in the (not tipped) conveying mode, but there are no high edge ridges at the conveyor element edges running crosswise to the conveyor direction.

It has been shown that the tipping conveyor element known from DE-PS 36 02 861 is far superior to the other previously described arrangements in terms of the problem being discussed at this point, but this previously known conveyor element still does not solve this problem satisfactorily.

Until now, with sorters equipped with such conveyor elements and, for example, deployed in postal package distributing facilities, the occurring rolls of drawings or the like were sorted manually or were laid by hand crosswise onto such a dish-shaped tipping conveyor element. Since such rolls of drawings or the like are usually considerably longer than the width of the supporting plate of the conveyor elements, side walls, light-barrier mountings and the like regularly had a highly disruptive effect on the trip of such rolls or the like to their destination. Furthermore, an undefined center of gravity evidently led to similar problems as those found with the above-mentioned dish-shaped tipping conveyor elements with high edge ridges.

When feeding manually, piece goods like rolls of drawings or the like were laid parallel to the longitudinal direction (in conveyor direction) of a tipping conveyor element. Even then, although the above-mentioned difficulties were considerably reduced, there was still no relatively short-term steadying (more precisely a steadying of the fed piece good of the type in question on a short stretch) because of the only slightly curved dish incline. This disturbed the operation just as before in an unacceptable (sometimes critical) manner.

SUMMARY OF THE INVENTION

Accordingly, the present invention is based on the task of creating a tipping conveyor element of the type described at the beginning, that can accommodate cylindrical piece goods like rolls of drawings and the like even when they are longer than the length or width of a tipping conveyor element. In the process, there should not only be a defined and fixed position for such piece goods after being fed, but this should also be possible on a relatively short stretch as instantaneously as possible.

According to the invention, the solution to this task is characterized in that for each side (i.e. preferably on both sides of the middle symmetric line, although this measure has advantages over the present state of the art even in a one-sided arrangement) a third supporting plate section connects to the second supporting plate section inward (i.e. toward the middle). This third supporting plate section is designed sloping (or curving) downward in relation to the adjacent second supporting plate section.

In order not to only achieve a defined or fixed position for such a piece good on a conveyor element (or on several consecutive conveyor elements, where applicable) at some time or other but rather to bring about this condition as soon as possible, it is preferable to have the second (situated between a first and third supporting plate section in the object of the invention) supporting plate sections each sloping (or curved) horizontally downward from the outside inward in such a way that, for example, after being fed (with essentially longitudinal axis running parallel to the conveyor direction)—depending on the feeding position—a roll of drawings or the like fed onto the supporting plate of such a tipping conveyor element runs (quickly) through a first supporting plate section and the immediately adjacent second supporting plate section into the preferably v-shaped middle basin formed by the 2 third supporting plate sections and is held securely and form-fittingly in this tray during conveyance.

In a much preferred form of construction of the present invention, the width of a third supporting plate section (preferably each element) measured crosswise to the conveyor direction is smaller in the rear area than in the front area. The result of this—as is explained further below using an example of construction—is that a roll of drawings or the like that is fed from a feeding device onto a tipping conveyor element approaching it obviously first reaches it with its front section. At transfer, its front section inevitably is immediately steered through the third supporting plate section (which works almost like a ramp) to the middle, particularly when—as is preferable—the width of a third supporting plate section in the (wider) front area is so great that a short supporting area still remains at the front edge section of the supporting plate with respect to the second supporting plate section and, where applicable, differently formed piece goods can be supported with this support area.

The competent expert will recognize right away that the object of invention at the basis of the present invention evidently can be or is achieved if (on both sides of the symmetric line of a conveyor element running in conveyor direction) more than three supporting plate sections are achieved respectively. But it has been shown that such a (complicated in production) form of construction is not necessary to successfully solve the task at hand. It is obviously particularly advantageous for a sure, form-fitting fixation of such a fed piece good if the supporting plate sections forming the middle area of the supporting plate and designed in mirror symmetry to each other are designed or run essentially in v-shape, with the aperture angle of the V preferably between approx. 60° and 135°.

BRIEF DESCRIPTION OF THE DRAWINGS

The invention is further explained below with forms of construction referring to drawings. It shows:

FIG. 1 a front-view, seen in conveying direction, of a dish-shaped supporting plate of a tipping conveying element according to the invention, seen in the direction of arrow I in FIG. 2;

FIG. 2 a top view of the conveyor element according to FIG. 1;

FIG. 3 an illustration corresponding to FIG. 2 of a conveyor element that has been modified compared to FIGS. 1 and 2;

FIG. 4 a cross-section of the conveyor element according to FIG. 3, seen in the direction of the traverse line IV—IV;

FIG. 5 the supporting plate of a conveyor element corresponding essentially to the conveyor element according to FIGS. 1 and 2 in perspective with a cylindrical piece good fed onto the conveyor element (and thus its supporting plate), with a length that is less than the length of the supporting plate as measured in conveyor direction;

FIG. 6 an arrangement of a cylindrical piece good that is (considerably) longer than the length, measured in conveyor direction, of the supporting plate of a conveyor element when having been fed onto two conveyor elements; and FIG. 7 the supporting plate of a conveyor element according to FIGS. 1, 2 or 5, 6, respectively with a cuboid piece good arranged on the conveyor element.

DETAILED DESCRIPTION OF THE PREFERRED EMBODIMENT

FIGS. 1 and 2 show, in a lateral top view in the direction of the arrow 1 indicating the conveyor direction, a tipping conveyor element 2 for a continuous piece good conveyor designed as tipping bucket conveyor, with its driven barrow tram (not shown) including many flexibly linked conveyor elements 2 that each have a dish-shaped supporting plate 3 at their upper end section. The edge sections of these supporting plates, running in conveyor direction 1, are curved in relation to the horizontal line on both sides of the middle symmetric line 4, as is described further below in detail.

More precisely, FIGS. 1 and 2 show the (illustrated in simplified manner) supporting plate 3 of a tipping conveyor element 2 according to the invention and a cylindrical piece good 5 arranged on top and indicated by dot-dash lines. This piece good can be a roll of drawings, for example.

Particularly from FIG. 1 one can see that the edge sections of the supporting plate 3 that run in conveyor direction (outer edge sections), designated throughout as first supporting plate sections 6, each are warped upward to the next adjacent section connected inward or toward the middle, designated throughout as second supporting plate section 7.

FIG. 1 also shows that not only the first supporting plate sections 6, 6 but also the second supporting plate sections 7,7 are each designed with a downward incline from outside inward.

A third supporting plate section 8 is connected to each of the two supporting plate sections 7 at the inside (i.e. toward the middle). This third section slopes downward in relation to the adjacent second supporting plate section 7, and the two third supporting plate sections 8, 8 forming the middle area of the supporting plate 3 and arranged in mirror symmetry are designed v-shaped and the v-angle α between the two third supporting plate sections 8, 8 in the form of construction shown in FIGS. 1 and 2 is 120°.

Before the method of operation of the tipping conveyor element 2 according to the invention is explained in greater detail, the variant shown in FIGS. 3 and 4 is first explained. The illustration according to FIG. 3 corresponds to the illustration according to FIG. 4 and also shows a top view of the supporting plate 3 (identical parts or those with the same effect are given the same reference numerals as in the form of construction according to FIGS. 1 and 2).

The essential difference in the design according to FIGS. 3 and 4 compared to the design according to FIGS. 1 and 2 lies in the fact that the width B measured crosswise to the conveyor direction 1 (see FIG. 4; in FIG. 3 the corresponding value is designated with B′ since it reproduces the projection of B) of the third supporting plate sections 8, 8 in the front area (seen in conveyor direction 1) of the supporting plate 3 is considerably greater than in the rear area (see FIG. 3), while the width B of the rear area constantly (and linearly) increases toward the front area.

The width B of the two third supporting plate sections 8, 8 is so great in the front area that at the front edge section 9 of the supporting plate 3, only a short supporting area remains with respect to the second support plate section 7 so that a narrow slot is formed at the trailing edge. This support area is shown by the beneath the article 5 in FIG. 3.

It should also be pointed out that the first supporting plate sections 6, 6 can be provided with a stiffening flange 12 at their outer edge 11, as indicated in the design according to FIGS. 1 and 2 with dot-dash lines.

It should also be pointed out that it can be practical to provide (at least) the inside of the third supporting plate sections 8, 8 with a friction lining 13 shown in FIG. 1 (draw in exaggerated thickness for greater clarity), while it is generally practical not to provide the inner sides facing the piece good of the first supporting plate sections 6, 6 and particularly the second supporting plate sections 7, 7 with a relatively high coefficient of friction.

If a cylindrical piece good 5 is fed, preferably using a feed device, for example, onto a sorter and thus (at least) the supporting plate 3 of a conveyor element 2, it first gets to a second supporting plate section 7, immediately rolls from it to the middle due to gravity and the incline of the second supporting plate sections 7, 7, and thus makes it to the middle v-shaped receiving area formed by the two third supporting plate sections 8, 8. In this receiving area it is then defined and held steady in form-fitting manner during conveyance, as shown in FIGS. 1 and 6.

If, as is usually desirable, one is interested in an immediate, nearly spontaneous "steadying" of the piece good 5 in the aforementioned defined position, it is highly recommended to have a supporting plate 3 in a design according to FIGS. 3 and 4 or a similar shape, in which the piece good 5 immediately comes with its front end onto a ramp-shaped third supporting plate section 8 during feeding (and accordingly rolls to the middle there), while the rear end section of the piece good 5 first comes to a second supporting plate section 7 but then, when leaving this supporting plate section 7 and reaching the v-shaped tray 8, 8, is immediately "caught" and held in form-fitting manner by it in such a way that the piece good 5 immediately attains its defined, fixed position in the middle area of the supporting plate 3.

The friction lining 13 shown as an example in FIG. 1 on the inner side of the third supporting plate sections 8, 8 can be particular practical if, during conveyance, there can be accelerations and slowing down of the conveyor elements 2 which, where applicable, can lead to a relative shifting of piece goods 5 on the supporting plates 3 if the friction lining between supporting plate 3 and piece good 5 is not large enough. In the process, it has been shown that a relatively high coefficient of friction in the area of the v-shaped tray 8, 8 does no harm at all to the tipping process if one ensures that the transition of the friction lining 7 to the inner side of the second supporting plate sections 7 is continuous, something that is accomplished quite easily.

FIG. 6 shows in perspective the arrangement of a cylindrical piece good 5 the length of which is considerably greater than the length, measured in conveyor direction 1, of a supporting plate 3 on two consecutive tipping conveyor elements 2 or their supporting plates 3,3.

Finally, FIG. 7 shows that the tipping conveyor elements 2 according to the invention are by no means exclusively intended and suitable for cylindrical piece goods 5, but rather that cuboid piece goods 5′ can also be conveyed on them in an effective manner.

Particularly with reference to the design according to FIGS. 3 and 4, it should be pointed out that the second supporting plate sections 7, 7 situated between a first supporting plate section 6 and a third supporting plate section 8 and/or the third supporting plate sections 8, 8 can be bent or curved downward from the outside inward, even crosswise to the longitudinal direction (see conveyor direction 1) of the supporting plate 3, as can already be seen in the design according to FIGS. 3 and 4 from the left part of the illustration of FIG. 4.

We claim:

1. A tipping conveyor element for a continuous piece goods conveyor comprising:
a plurality of linked conveyor elements having a leading edge and a trailing edge, each of said linked conveyor elements including a supporting plate having outer edge portions which are contiguous with intermediate portions which, in turn, are contiguous with inner portions, said portions being symmetrically arranged about a middle line extending in a conveying direction, said outer edge portions being angled upwardly relative to said intermediate portions and said inner portions being angled downwardly relative to said intermediate portions, wherein the width of each of said inner portions measured transversely to the middle line is greater along the leading edge than along the trailing edge.

2. A tipping conveyor element as in claim 1, wherein the width of each of said inner portions increases continuously from the trailing edge to the leading edge.

3. A tipping conveyor element as in claim 1, wherein the width of each of said inner portions increases linearly from the trailing edge to the leading edge.

4. A tipping conveyor element as in claim 1, wherein the width of each of said inner portions is sufficiently large along the leading edge so that a narrow slot is formed by said inner portions between said intermediate portions along the trailing edge.

5. A tipping conveyor element as in claim 1, wherein each of said intermediate portions are inclined downwardly from an outer edge thereof towards said middle line.

6. A tipping conveyor element as in claim 5, wherein each of said inner portions are inclined downwardly from an outer edge thereof towards said middle line.

* * * * *